UNITED STATES PATENT OFFICE.

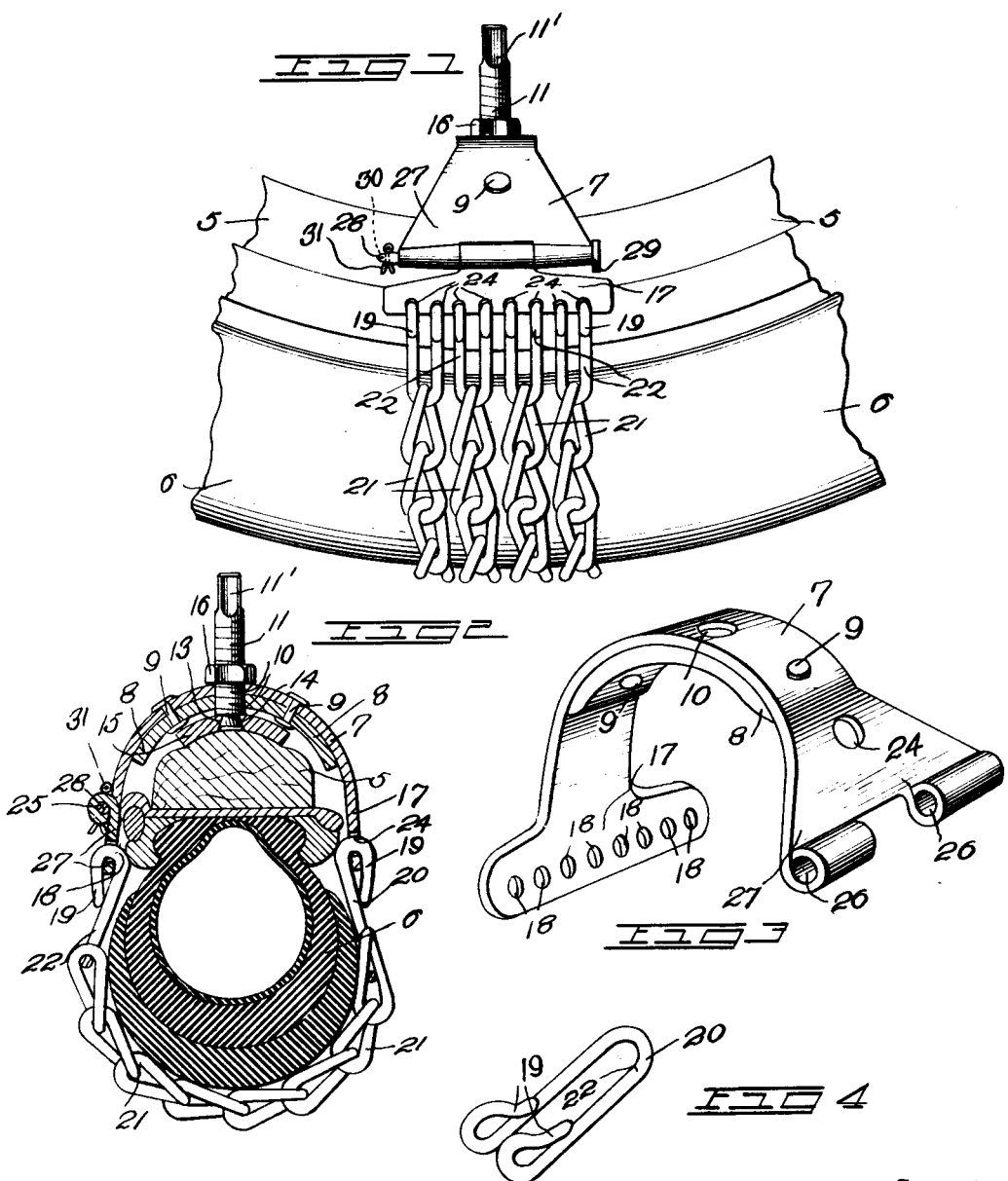

EDWARD SIMMONS AND WARREN SHERIDAN DAY, OF OROVILLE, CALIFORNIA.

ANTISKIDDING DEVICE.

1,117,099.

Specification of Letters Patent.  Patented Nov. 10, 1914.

Application filed July 5, 1912. Serial No. 707,755.

*To all whom it may concern:*

Be it known that we, EDWARD SIMMONS and WARREN S. DAY, citizens of the United States, residing at Oroville, in the county of Butte and State of California, have invented new and useful Improvements in Antiskidding Devices, of which the following is a specification.

The general object of this invention is the provision of an anti-skidding device particularly adapted for use in connection with automobile wheels, said device comprising, essentially, a yoke which is adapted to be detachably and securely fastened to the felly of a wheel, said yoke having connected thereto at one end thereof a plurality of chains which are adapted to embrace the tire and be detachably connected at their free ends to the other end of said yoke.

In carrying out the objects of the invention generally stated above, it will be understood, of course, that the essential features thereof are susceptible to changes in details and structural arrangements, one preferred and practical embodiment being shown in the accompanying drawing, wherein:—

Figure 1 is a fragmentary side elevation of a wheel, showing the device applied thereto and constructed in accordance with the invention. Fig. 2 is a section on the line 2—2 of Fig. 1. Fig. 3 is a detail perspective of the yoke used in connection with the invention. Fig. 4 is a similar view of a hook used for connecting the chains to the yoke.

Referring more particularly to the accompanying drawing, in which like reference characters designate similar parts, the numeral 5 indicates the felly of a wheel and the numeral 6 the tire therefor.

The device which comprises this invention consists of a substantial U-shaped yoke 7 having an arcuate reinforcing plate 8 secured to its inner surface medially the ends thereof by means of rivets or other suitable fasteners 9. The yoke 7 and the plate 8 are provided with alined centrally located openings 10 which are adapted to receive the threaded adjusting bolt 11, said bolt being provided at its outer end with a squared portion 10 adapted to receive a suitable tool for turning said bolt when securing the device to a wheel. The extreme inner end of the bolt 11 is provided with an annular groove 13 adapted to receive the central opening 14 formed in the arcuate fastening plate 15. When securing the device to the wheel, the bolt 11 is adjusted inwardly until the plate 15 comes into contact with the felly 5 and the plate 15 is held in its adjusted position by means of a nut 16 which is threaded upon the bolt 11 and which is adapted to engage the exterior surface of the yoke 7 thereby preventing the rotation of the bolt whereby the plate 15 will be at all times retained in secure engagement with the felly 5.

Formed integrally with one end of the yoke 7 is a transverse plate 17 which is adapted to engage and extend longitudinally of the tire when the yoke is in position. The plate 17 is provided with a plurality of transverse openings 18 which are adapted to receive the bent ends 19 of the substantially U-shaped hooks 20. Each of the hooks 20 is adapted to receive one end of a chain 21, the other end of said chain being adapted to be connected to a hook 22 which is similar in construction to the hook 20, each of said hooks being adapted to be connected to the plate 23 having a plurality of openings 24 therein for the reception of the bent portions of said hook. The plate 23 is also adapted to extend transversely of the yoke 7 when in position and said plate is provided upon one of its longitudinal edges with an extension which is bent to form an eye 25. The eye 25 is adapted to be mounted between the spaced alining eyes 26 formed upon the enlarged end 27 of the yoke 7. A pintle 28 is adapted to be passed through the eyes 26 and 27 when in alining position whereby the plate 23 is connected to the yoke and the chains 21 are thus securely held in engagement with the tire. In order to prevent the displacement of the pintle 26, the same is provided at one end thereof with a head 29 and adjacent the other end with a transverse opening 30 which is adapted to receive a cotter pin 31.

It will be understood, of course, that in use, a plurality of anti-skidding devices such as has been described may be fastened to the wheel thus effectually preventing the skidding of the latter.

From the foregoing description taken in connection with the accompanying drawing, it will be seen that the invention contemplates providing an anti-skidding device which is simple in construction thus reducing the cost of manufacture of the same to a minimum and which is durable and effective in carrying out the purpose for which it is designed.

What is claimed is:—

An anti-skidding device for tires including a yoke shaped to partly embrace the wheel felly, said yoke including an integral transverse projected plate formed with a series of longitudinally alined openings, the opposite end of the yoke being formed to provide one member of a hinge connection, a second plate formed with a complementary hinge member to engage the yoke hinge connection, said second plate formed with a longitudinally arranged series of openings respectively alining transversely with the openings of the first mentioned plate, whereby to provide for the securing of chains encircling the exposed portions of the tire directly transverse thereof, and means carried by the yoke and engaging the felly to exert a strain on the connecting chains when in place.

In testimony whereof we affix our signatures in presence of two witnesses.

EDWARD SIMMONS.
WARREN SHERIDAN DAY.

Witnesses:
T. W. GREEN,
N. A. DRESSER.